July 2, 1968

L. BOVONE 3,390,582

DEVICE FITTED WITH CLAMPING MEANS, FOR IMPARTING
A RECIPROCATING MOTION TO A MACHINE COMPONENT

Filed Oct. 12, 1965

INVENTOR.
LUIGI BOVONE

BY Steinberg & Blake
attys

INVENTOR.
LUIGI BOVONE
BY Steinberg + Blake
attys

United States Patent Office 3,390,582
Patented July 2, 1968

3,390,582
DEVICE FITTED WITH CLAMPING MEANS, FOR IMPARTING A RECIPROCATING MOTION TO A MACHINE COMPONENT
Luigi Bovone, Circonvallazione Stura,
Ovada, Alessandria, Italy
Filed Oct. 12, 1965, Ser. No. 495,192
Claims priority, application Italy, Feb. 5, 1965,
2,477/65
7 Claims. (Cl. 74—37)

ABSTRACT OF THE DISCLOSURE

A device for producing reciprocating motion from a drive in the form of an endless means which has opposed runs one of which always moves in one direction and the other of which always moves in an opposite direction, during operation of the drive. A carriage means is situated in the region of the endless means for shifting movement back and forth in the directions in which the runs of the endless means extend, and this carriage means carries a pair of clamp means which respectively coact with the runs for alternately clamping the carriage means thereto, this carriage means moving back and forth along strokes which are shorter than the total length of the runs, and the runs themselves are substantially straight and parallel to each other. A clamp-actuating means coacts with the pair of clamp means for alternately engaging the latter with the runs of the endless means, so that in this way the carriage means can be clamped to one of the runs for movement therewith in the direction in which this one run moves, and when the carriage means reaches the end of its stroke in this latter direction, the clamp-actuating means disengages the clamp means which clamps the carriage means to the one run and engages the other clamp means to clamp the carriage means to the other run, so that the direction of movement of the carriage means is reversed and it now moves along a reverse stroke, at the end of which the clamp-actuating means again acts to release the clamp means which coacts with the said other run and engage the clamp means which coacts with the one run of the endless means, so that in this way the carriage means is again reversed so as to again move with the one run of the endless means.

---

This invention relates to a device by which the continuous, unidirectional motion of a band, belt, chain or similar driving element can be converted into a reciprocating motion of a driven component. In more detail, the invention concerns a device by which a reciprocating motion can be imparted to a slide, from a power source represented by a belt, band or similar endless component. In type in its application to a mirror making machine, wherein different liquids are sprayed by nozzles onto glass plates carried by moving conveyor bands, and wherein the necessity exists to impart a reciprocating motion in a direction perpendicular to that of glass plates being treated to the nozzles.

The main purpose of this invention consists in the provision of a simple, efficient and inexpensive device, to convert a continuous, unidirectional motion from a driving element, that may consist of a band, belt or the like, into a reciprocating motion to be imparted to another component, and particularly to the nozzle supporting slide of a mirror making machine.

The above object, along with further objects which will be best appreciated from a consideration of the following detailed description, are attained by a device which is essentially characterized in that the component, to which the reciprocating motion is to be imparted (e.g., a slide) is provided with clamping jaws, designed to alternately engage, under the control of possibly adjustable, end-stroke cam mechanism, with either upper or lower runs of the driving member, consisting of a belt, band, chain or the like.

In more detail, according to a proposal of the invention, lever mechanisms are swung by a cam at either end stroke position of the slide, thus releasing a clamping jaw by which the slide was connected with one of runs of endless belt, or band, or the like, and engaging another jaw with the other run thereof, which is obviously traveling in a direction opposite to that of preceding one.

Thus, it can be readily appreciated that the invention is based on the fact that a belt, or other endless transmission means, consists of two runs, i.e., a running-on, or tight run, and a running-off, or slack run, which are generally parallel with each other, and are moving in opposite, or different direction. Thus, the invention proposes to have the slide coupled, at their end-stroke positions, with either run, in order to impart a reciprocating motion thereto.

The invention will be better appreciated from a consideration of the following, detailed description of a preferred embodiment thereof, as shown in the accompanying drawings, both description and drawings being given only as an example. In the drawings.

Figure 1:
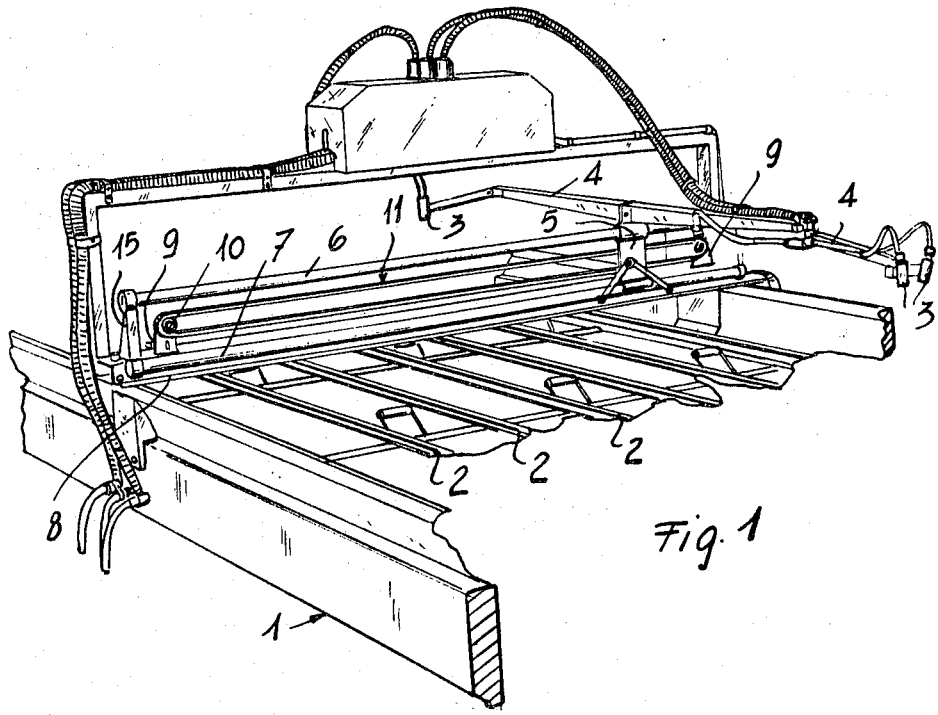
FIG. 1 is a partly perspective view of a mirror making machine, equipped with the nozzles, to which a reciprocating motion is imparted by means of the device according to the invention.

Referring now to FIG. 1, wherein the machine embodying the device is shown, 1 is a supporting frame, 2 is a row of conveyor belts, carrying the glass plates, 3 are the nozzles which the different liquids are sprayed onto the plates, 4 are cantilever arms, by which the nozzles are supported, and which are secured to a slide 5, to which a reciprocating motion is to be imparted along the two guide bars 6 and 7, by which it is supported. As already stated, the nozzles are directed toward the glass plates, and the liquids sprayed by them are designed for a particular processing of glass plates.

The two guides 6 and 7 consist of two metal bars, carried by a cross bar 8, that extends crosswise to forward motion of conveyor belts 2, by which the glass plates to be processed are conveyed across the machine. Fitted on said crossbar 8 are two bearings 9, whereon are respectively mounted a return pulley 10 for a belt 11, and a pulley that is driven by an electric motor, through a belt transmission (not shown). The belt 11 acts as a driving member for the slide 5 which, according to the invention, is alternately connected with the driving run 11a, and with the slack run 11b thereof each time that the end stroke positions are attained by the slide.

Figure 2:
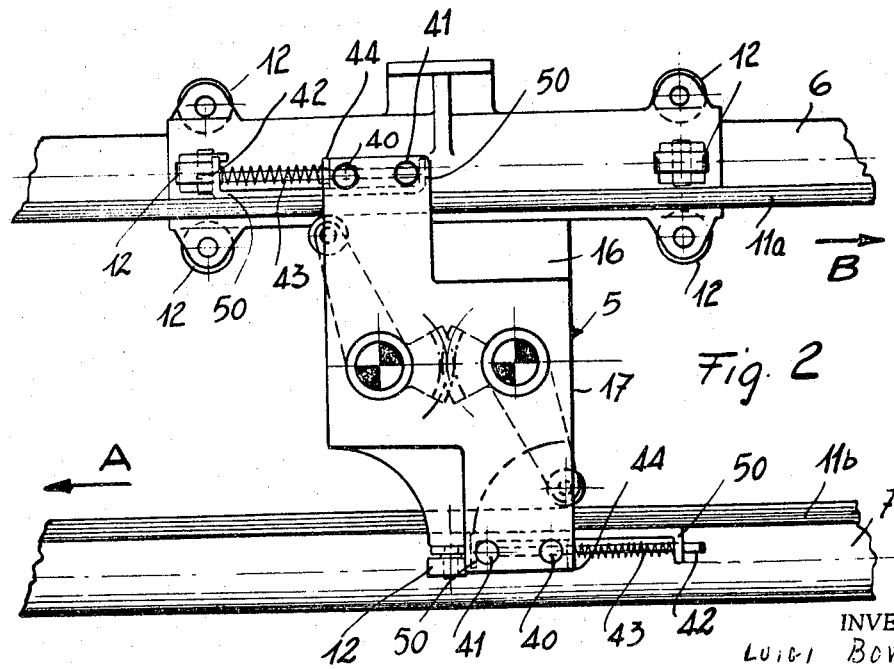
FIG. 2 is a front view of, wherein some components thereof have been omitted to prevent the drawing from becoming too crowded (as seen from side II in FIG. 4).
Figure 3:
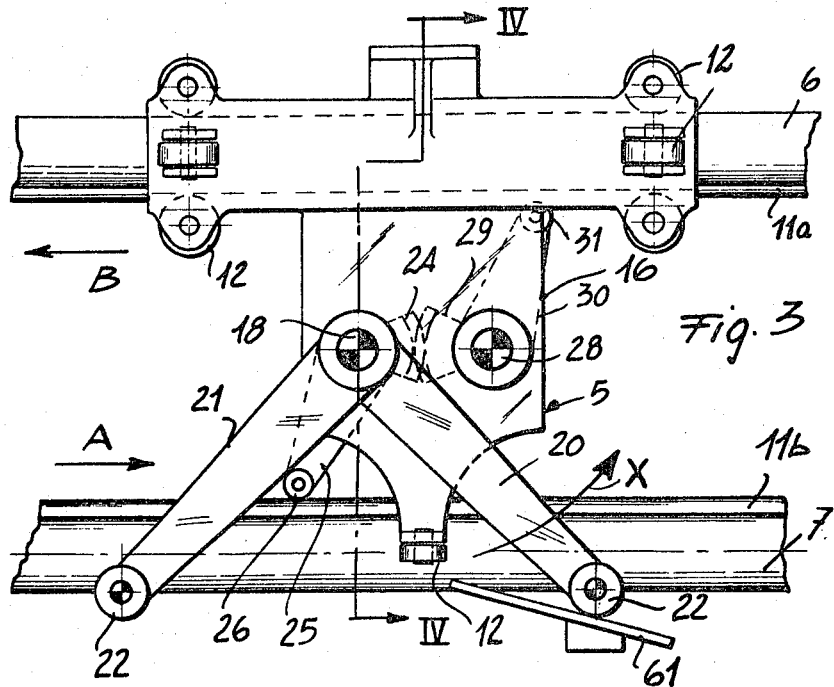
FIG. 3 is a view taken from side III in the FIG. 4, and also here some components are omitted for the same reasons.
Figure 4:
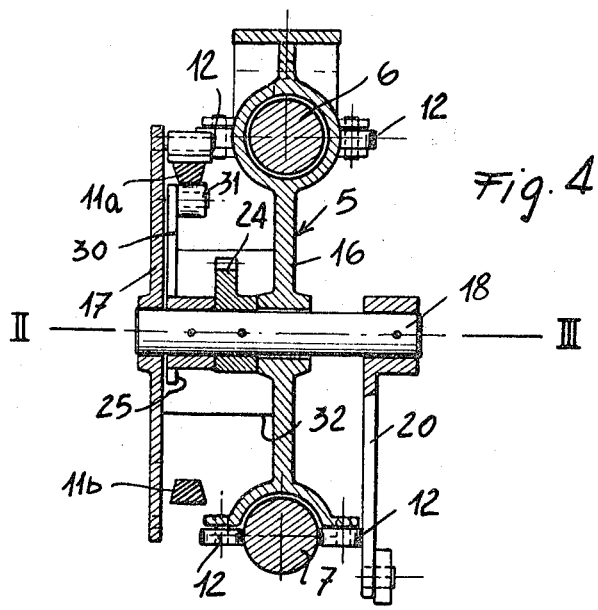
FIG. 4 is a section taken on the line IV—IV of FIG. 3.

Reference will be now made, for a more detailed description of the device according to the invention, to all other figures of drawings, i.e. to FIGS. 2, 3 and 4. The slide 5, that in latter figures has a design slightly different from that shown, for clearness' sake, in the FIG. 1, is supported, through rollers 12, by the round guide bars 6 and 7, that are in turn supported in any suitable manner, e.g. by means of small brackets 15 on the crossbar 8.

The slide 5 carries, between two plates 16 and 17 parallel with each other, a shaft 18, extending beyond plate 16 and fixed with a bellcrank lever that has at an angle of 90 deg. to each other two arms 20 and 21. A toothed sector 24 is keyed on the portion of shaft 18 that extends between the two plates 16 and 17. An arm 25, carrying a roller 26 at its free end, is keyed on the same shaft, laterally of the toothed sector 24.

A further toothed sector 29, that is kept in mesh with toothed sector 24, is keyed on another shaft 28, which is also revolvingly fitted between the two plates. Fast with shaft 28 is an arm 30, having a roller 31 at its free end. Both rollers 26 and 31 represent one of components of clamping jaws, by which the slide can be alternately connected with runs 11a and 11b of belt 11.

Plates 16 and 17 are fixed with each other by means of transverse members 32 (FIG. 4), that are secured thereto by any suitable means.

An adjusting screw 42 is supported by two rollers 40 and 41, that are respectively fitted on the upper and lower ends of plate 17. A spring 43, that is wound round adjusting screw 42, rests at one end on a button 44, secured to plate 17, while its opposite end rests against a C-shaped sliding block 50. The roller 41 allows a sliding motion of block 50, while the shock caused by the reversal of stroke is absorbed by the spring 43.

Cam surfaces, at the upper sides of inclined plates 61, can be located on the crossbar 8, at the points wherein a stroke reversal of slide 5 is required. The inclined plates 61 (see FIG. 4) can be adjusted, by suitable means (not shown) on the crossbar, in order to adjust the length of stroke of slide 5. The cams 61 are designed to cooperate with the rollers 22 at the lower ends of arms 20 and 21 of the bell crank lever.

The operation of the above described device is as follows: Assuming that the belt 11 is driven in such a manner that its run 11b, seen as in the FIG. 2, is moved in the direction of arrow A, then the upper run 11a will be obviously moved in the opposite direction, as indicated by the arrow B. When the slide 5 is to be moved together with the run 11a of belt, i.e. in the direction of arrow B in the FIG. 2, the belt is clamped, at a suitable point of its run 11a, between the roller 31 and the C-shaped sliding block 50, that is located on top thereof. At the end of slide stroke, the roller 22 of arm 20, which is situated in a plane different from that of roller 22 of arm 21, will rise along the cam 61, whereby a swinging motion in the direction of arrow X is imparted to arm 20. As a consequence thereof, roller 31 is displaced from the run 11a of belt 11, whereby the slide is disengaged therefrom. However, this swinging motion also results in an engagement of roller 26 against the belt, which is thereby pressed against the lower sliding element 50, thus causing the belt run 11b to be coupled with the slide. As a consequence thereof, the slide is now being moved in the direction of arrow A, i.e. in the running direction of run 11b of the belt 11. A reverse procedure occurs at the opposite end stroke position, i.e. the slide is disengaged from the run 11b, and coupled again with the run 11a, thus beginning a return stroke.

Thus, it will be seen that the drive takes the form of the endless means 11 which has the parallel substantially straight runs 11a and 11b which respectively move continuously in the opposed directions indicated by the arrows A and B. The slide 5 forms a carriage means which is shiftable longitudinally of the straight, parallel runs 11a and 11b of the endless means 11 while being situated in the region of this endless means, and the carriage means 5 carries on the one hand a clamp means 31, 50 which coacts with the run 11a and on the other hand a clamp means 26, 50 which coacts with the run 11b. The bell crank 20, 21 together with the rollers 22 thereof form with the cams 61 as well as with the transmission formed by the shafts 18, 28, the gear sectors 24, 29, and the levers 25 and 30 a clamp-actuating means for automatically actuating the pair of clamp means which respectively coact with the runs 11a and 11b of the endless means 11, this clamp-actuating means providing alternate engagement of the pair of clamp means respectively with the pair of runs as the carriage means 5 reaches the ends of its strokes. The strokes of the carriage means 5 are of course shorter than the total lengths of the runs 11a and 11b. A spring means is provided for absorbing forces encountered when the carriage means reverses its direction of movement.

While the invention has been described in detail with respect to one, now preferred embodiment form thereof, it will be understood, by those skilled in the art, after understanding the invention, that various changes and modifications may be made without departing from the true spirit and scope of the invention, and is intended, therefore, to cover all such changes and modifications in the appended claims.

What I claim is:

1. A device for producing reciprocating motion from a unidirectional motion, comprising endless drive means having a pair of opposed substantially straight and substantially parallel runs which continuously move, during operation of said endless drive means, in one direction at one of said runs and in an opposed direction at the other of said runs, carriage means situated in the region of said runs of said endless means for reciprocating movement back and forth longitudinally of said runs, a pair of clamp means carried by said carriage means and respectively coacting with said runs for releasably clamping said carriage means thereto, and clamp-actuating means coacting with said pair of clamp means for alternately clamping the latter to said runs, respectively, said clamp-actuating means actuating one of said clamp means to clamp said carriage means to said one run for moving said carriage means in said one direction along a stroke shorter than the total length of said one run, and said clamp-actuating means then unclamping said one clamping means from said one run at the end of the latter stroke and simultaneously clamping the other clamp means to the other of said runs for moving said carriage means with said other run in said opposed direction along an opposed stroke which is shorter than the total length of said other run, whereupon said clamp-actuating means unclamps said other clamp means and clamps said one clamp means again to said one run for reversing the direction of movement of said carriage means, and so on, said runs of said endless means respectively having outer surfaces directed away from each other and inner surfaces directed toward each other, said pair of clamp means respectively including outer clamp members situated next to said outer surfaces of said runs, respectively, and inner clamp members situated next to said inner surfaces of said runs, respectively, and said clamp-actuating means acting on said inner clamp members for alternately displacing them toward and away from said inner surfaces of said runs, respectively, to alternately clamp said pair of clamp means to said runs, said clamp-actuating means including a pair of parallel shafts situated between and extending transversely with respect to said runs, said carriage means supporting said shafts for rotary movement, a pair of gear sectors meshing with each other and fixed to said shafts, and a pair of levers fixed to said shafts and extending therefrom toward said inner surfaces of said runs, respectively, said levers respectively having outer ends carrying said inner clamp members, respectively, and said clamp-actuating means including a structure operatively connected to one of said shafts for turning the latter in one direction when said carriage means reaches the end of one of its strokes and for turning said one shaft in an opposed direction when said carriage means reaches the end of its next stroke, whereby said inner clamp members will be alternately displaced toward and away from said inner surfaces of said runs, respectively.

2. The combination of claim 1 and wherein said structure which is operatively connected to said one shaft includes a bell crank having a pair of arms respectively extending at different angles from said one shaft and said pair of arms respectively carrying cam-engaging members at outer ends of said arms, and cams situated respectively in the path of movement of said outer ends of said arms of said bell crank for engaging the cam-engaging members to alternately turn said bell crank and said one shaft therewith in opposed directions at the ends of successive strokes of said carriage means, respectively.

3. The combination of claim 2 and wherein said arms of said bell crank form an angle of 90° between themselves.

4. The combination of claim 3 and wherein said cam-engaging members are in the form of rollers and said cams are in the form of plates which are inclined with respect to the direction of travel of said carriage means for engaging said rollers to turn said bell crank.

5. A device for producing reciprocating motion from a unidirectional motion, comprising endless drive means having a pair of opposed substantially straight and substantially parallel runs which continuously move, during operation of said endless drive means, in one direction at one of said runs and in an opposed direction at the other of said runs, carriage means situated in the region of said runs of said endless means for reciprocating movement back and forth longitudinally of said runs, a pair of clamp means carried by said carriage means and respectively coacting with said runs for releasably clamping said carriage means thereto, and clamp-actuating means coacting with said pair of clamp means for alternately clamping the latter to said runs, respectively, said clamp-actuating means actuating one of said clamp means to clamp said carriage means to said one run for moving said carriage means in said one direction along a stroke shorter than the total length of said one run, and said clamp-actuating means then unclamping said one clamping means from said one run at the end of the latter stroke and simultaneously clamping the other clamp means to the other of said runs for moving said carriage means with said other run in said opposed direction along an opposed stroke which is shorter than the total length of said other run, whereupon said clamp-actuating means unclamps said other clamp means and clamps said one clamp means again to said one run for reversing the direction of movement of said carriage means, and so on, and a pair of spring means respectively coacting with said pair of clamp means for absorbing forces encountered at the ends of the strokes of said carriage means when the direction of movement thereof is reversed.

6. A device for producing reciprocating motion from a unidirectional motion, comprising endless drive means having a pair of opposed substantially straight and substantially parallel runs which continuously move, during operation of said endless drive means, in one direction at one of said runs and in an opposed direction at the other of said runs, carriage means situated in the region of said runs of said endless means for reciprocating movement back and forth longitudinally of said runs, a pair of clamp means carried by said carriage means and respectively coacting with said runs for releasably clamping said carriage means thereto, and clamp-actuating means coacting with said pair of clamp means for alternately clamping the latter to said runs, respectively, said clamp-actuating means actuating one of said clamp means to clamp said carriage means to said one run for moving said carriage means in said one direction along a stroke shorter than the total length of said one run, and said clamp-actuating means then unclamping said one clamping means from said one run at the end of the latter stroke and simultaneously clamping the other clamp means to the other of said runs for moving said carriage means with said other run in said opposed direction along an opposed stroke which is shorter than the total length of said other run, whereupon said clamp-actuating means unclamps said other clamp means and clamps said one clamp means again to said one run for reversing the direction of movement of said carriage means, and so on, said runs of said endless means respectively having outer surfaces directed away from each other and inner surfaces directed toward each other, said pair of clamp means respectively including outer clamp members situated next to said outer surfaces of said runs, respectively, and inner clamp members situated next to said inner surfaces of said runs, respectively, and said clamping actuating means acting on said inner clamp members for alternately displacing them toward and away from said inner surfaces of said runs, respectively to alternately clamp said pair of clamp means to said runs, said outer clamp members being in the form of enlongated substantially C-shaped members respectively having outer ends directed away from said outer surfaces of said runs and intermediate said outer ends elongated portions extending longitudinally along said outer surfaces of said runs respectively, and a pair of spring means respectively pressing against end portions of said pair of C-shaped members for absorbing forces encountered at the ends of the strokes of said carriage means when the latter reverses its direction of movement.

7. The combination of claim 6 and wherein said inner clamp members of said pair of clamp means are in the form of rollers situated adjacent the inner surfaces of said runs, respectively.

References Cited

UNITED STATES PATENTS

| 3,067,961 | 12/1962 | Chidgey et al. | 74—37 |
| 1,629,300 | 5/1927 | Petersen | 74—74 X |
| 2,528,286 | 10/1950 | Pianta et al. | 74—37 |
| 2,653,022 | 9/1953 | Armstrong | 74—37 X |
| 2,728,238 | 12/1955 | Paasche | 74—37 X |
| 2,911,835 | 11/1959 | Smith | 74—37 |

FOREIGN PATENTS 985,759 7/1951 France.

FRED C. MATTERN, Jr., *Primary Examiner.*

W. S. RATLIFF, *Assistant Examiner.*